(12) United States Patent
Umetsu et al.

(10) Patent No.: US 11,632,008 B2
(45) Date of Patent: Apr. 18, 2023

(54) ARRANGEMENT STRUCTURE OF WIRING MEMBER FOR ROTATING ELECTRICAL MACHINE

(71) Applicant: Hitachi Metals, Ltd., Tokyo (JP)

(72) Inventors: Jun Umetsu, Tokyo (JP); Noriyuki Takahashi, Tokyo (JP); Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 156 days.

(21) Appl. No.: 16/991,833

(22) Filed: Aug. 12, 2020

(65) Prior Publication Data

US 2021/0066986 A1 Mar. 4, 2021

(30) Foreign Application Priority Data

Aug. 29, 2019 (JP) .............................. JP2019-156708

(51) Int. Cl.
    *H02K 3/50* (2006.01)
    *H02K 5/22* (2006.01)
    *H02K 5/24* (2006.01)

(52) U.S. Cl.
    CPC .............. *H02K 3/50* (2013.01); *H02K 5/225* (2013.01); *H02K 5/24* (2013.01)

(58) Field of Classification Search
    CPC ............ H02K 3/46; H02K 3/50; H02K 3/505; H02K 5/22; H02K 5/225; H02K 2203/06; H02K 2203/09; H02K 5/24
See application file for complete search history.

(56) References Cited

U.S. PATENT DOCUMENTS

| 7,986,067 | B2 | 7/2011 | Yano et al. |
| 10,199,898 | B2 | 2/2019 | Haruno et al. |
| 10,320,257 | B2 | 6/2019 | Koiwai et al. |
| 2010/0090547 | A1 | 4/2010 | Yano et al. |

(Continued)

FOREIGN PATENT DOCUMENTS

| FR | 2466093 A1 * | 3/1981 |
| JP | 2010-098815 A | 4/2010 |

(Continued)

OTHER PUBLICATIONS

Office Action issued in the corresponding Japanese Patent Application No. 2019-156708 dated Sep. 27, 2022.

*Primary Examiner* — Eric Johnson
(74) *Attorney, Agent, or Firm* — Thomas W. Cole; Calderon Safran & Cole P.C.

(57) ABSTRACT

An arrangement structure of wiring member for rotating electrical machine is configured in such a manner that a wiring member for rotating electrical machine including a plurality of conductive wires and connecting coil ends of a stator to electrodes of a terminal block in a rotating electrical machine is arranged on an arranging target member. The wiring member for rotating electrical machine includes a holding portion including a molded resin so as to cover all the plurality of conductive wires together and holds the plurality of conductive wires. A cushioning member comprising an elastic body is provided between the holding portion and the arranging target member. The holding portion is arranged on the arranging target member via the cushioning member.

7 Claims, 9 Drawing Sheets

(56) References Cited

U.S. PATENT DOCUMENTS

| | | | | |
|---|---|---|---|---|
| 2011/0187213 A1* | 8/2011 | Kitagawa | ............... | H02K 5/225 |
| | | | | 310/71 |
| 2012/0319513 A1* | 12/2012 | Okamoto | ........... | H01R 13/5202 |
| | | | | 310/71 |
| 2016/0336829 A1* | 11/2016 | Haru | ...................... | H02K 3/522 |
| 2016/0380502 A1* | 12/2016 | Koiwai | .................. | H02K 15/12 |
| | | | | 310/71 |
| 2018/0163728 A1* | 6/2018 | Zugelder | ................ | F04D 29/08 |

FOREIGN PATENT DOCUMENTS

| | | | | |
|---|---|---|---|---|
| JP | 5902726 B2 | 3/2016 | | |
| JP | 2017-017798 A | 1/2017 | | |
| JP | 2017-078528 A | 4/2017 | | |
| WO | WO-03001647 A1 * | 1/2003 | ............. | H02K 11/33 |

* cited by examiner

ARRANGEMENT STRUCTURE OF WIRING MEMBER FOR ROTATING ELECTRICAL MACHINE

CROSS-REFERENCE TO RELATED APPLICATION

The present application is based on Japanese Patent Application No. 2019-156708 filed on Aug. 29, 2019, the entire contents of which are incorporated herein by reference.

BACKGROUND OF THE INVENTION

1. Field of the Invention

The invention relates to an arrangement structure of a wiring member for rotating electrical machine.

2. Description of the Related Art

It has been known to provide a wiring member for rotating electrical machine, which connects coil ends of a stator to electrodes of a terminal block in a rotating electrical machine. A member which is known as such a wiring member for rotating electrical machine includes plural conductive wires and a holding portion which is formed by molding a resin so as to cover all the plural conductive wires together and holds the plural conductive wires.

The configuration in which the holding portion is arranged on an arranging target member such as stator core has been examined to reduce the impact of vibration particularly for a wiring member for rotating electrical machine which is used in a rotating electrical machine mounted on a vehicle (see e.g. Japanese Patent No. 5902726).

Patent Document 1: Japanese Patent No. 5902726

In case that the holding portion is arranged on the arranging target member as mentioned above, however, a gap due to a manufacturing error may be formed between the holding portion and the arranging target member. When vibration is applied in the state that such a gap is present, the holding portion and the arranging target member may collide with each other and the holding portion may be damaged.

SUMMARY OF THE INVENTION

Therefore, it is an object of the invention to provide an arrangement structure of a wiring member for a rotating electrical machine, in which damage on a holding portion due to vibration can be suppressed.

According to the present invention, for solving the above problem, an arrangement structure of wiring member for rotating electrical machine is configured in such a manner that a wiring member for rotating electrical machine comprising a plurality of conductive wires and connecting coil ends of a stator to electrodes of a terminal block in a rotating electrical machine is arranged on an arranging target member, wherein the wiring member for rotating electrical machine comprises a holding portion including a molded resin so as to cover all the plurality of conductive wires together and holds the plurality of conductive wires, a cushioning member comprising an elastic body is provided between the holding portion and the arranging target member, and the holding portion is arranged on the arranging target member via the cushioning member.

Points of the Invention

According to the present invention, it is possible to provide an arrangement structure of a wiring member for a rotating electrical machine, in which damage on a holding portion due to vibration can be suppressed.

BRIEF DESCRIPTION OF THE DRAWINGS

Next, the present invention will be explained in more detail in conjunction with appended drawings, wherein:

FIGS. 1A and 1B show an example configuration of a rotating electrical machine having an arrangement structure of a wiring member for a rotating electrical machine in an embodiment of the present invention, wherein FIG. 1A is a general view and FIG. 1B is a partially enlarged view of FIG. 1A;

FIGS. 5A to 5C show the wiring member for rotating electrical machine, wherein FIG. 5A is a diagram as viewed in the axial direction, FIG. 5B is a diagram as viewed in a circumferential direction, and FIG. 5C is a perspective view;

DETAILED DESCRIPTION OF THE PREFERRED EMBODIMENT

Embodiment

An embodiment of the invention will be described below in conjunction with the appended drawings.

Figure 1A:
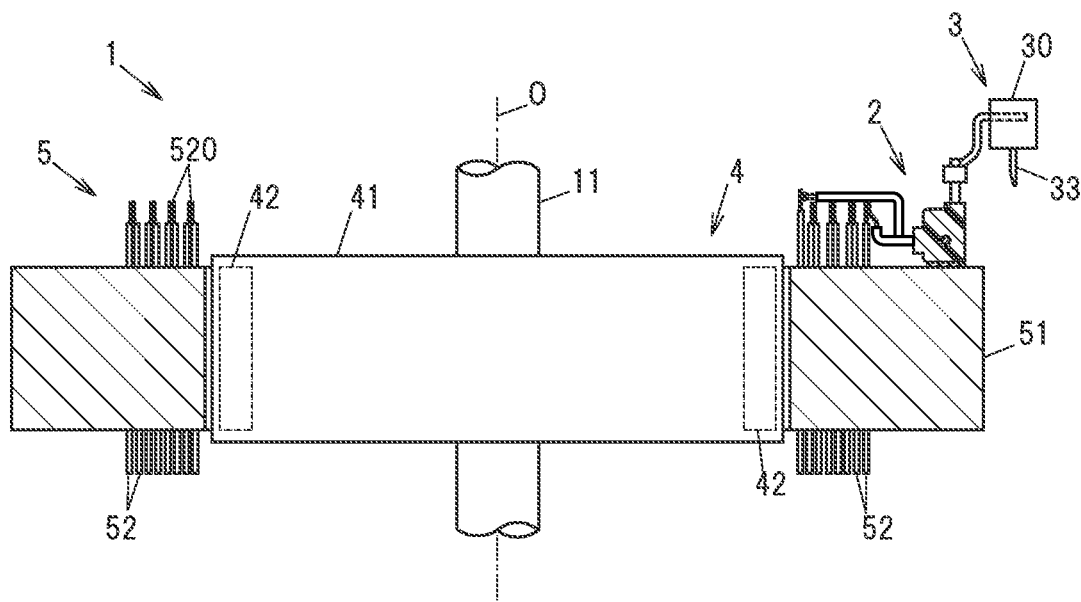
Figure 1B:
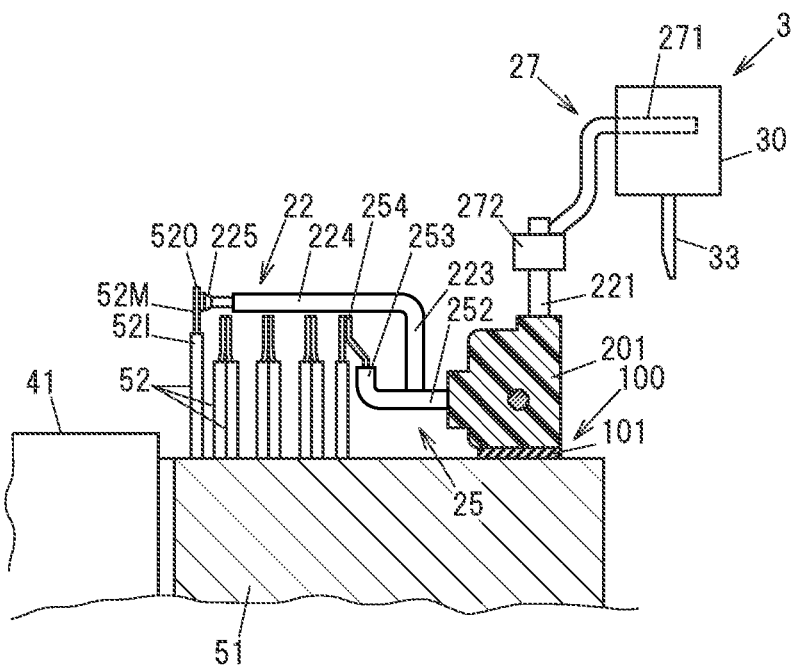

FIGS. 1A and 1B show an example configuration of a rotating electrical machine having an arrangement structure of wiring member for rotating electrical machine in the present embodiment, wherein FIG. 1A is a general view and FIG. 1B is a partially enlarged view of FIG. 1A.

A rotating electrical machine 1 includes a wiring member 2 for rotating electrical machine, a terminal block 3, a rotor 4 through which a shaft 11 is inserted at the center, and a stator 5 arranged to surround the rotor 4. The rotor 4 is configured that plural magnets 42 are embedded in a rotor core 41 formed of a soft magnetic metal, and the rotor 4 rotates with the shaft 11. The stator 5 has a stator core 51 formed of a soft magnetic metal and plural coil pieces 52.

The rotating electrical machine 1 is mounted on a vehicle powered by electricity, such as electric vehicle or so-called hybrid vehicle. Although the rotating electrical machine 1 used as an electric motor is described in the following description, it is possible to use the rotating electrical machine 1 as a generator. Hereinafter, a direction parallel to a rotational axis O of the shaft 11 is referred to as the axial direction, a direction passing the rotational axis O and perpendicular to the rotational axis O is referred to as the radial direction, and a direction perpendicular to the axial and radial directions is referred to as the circumferential direction.

Figure 2:
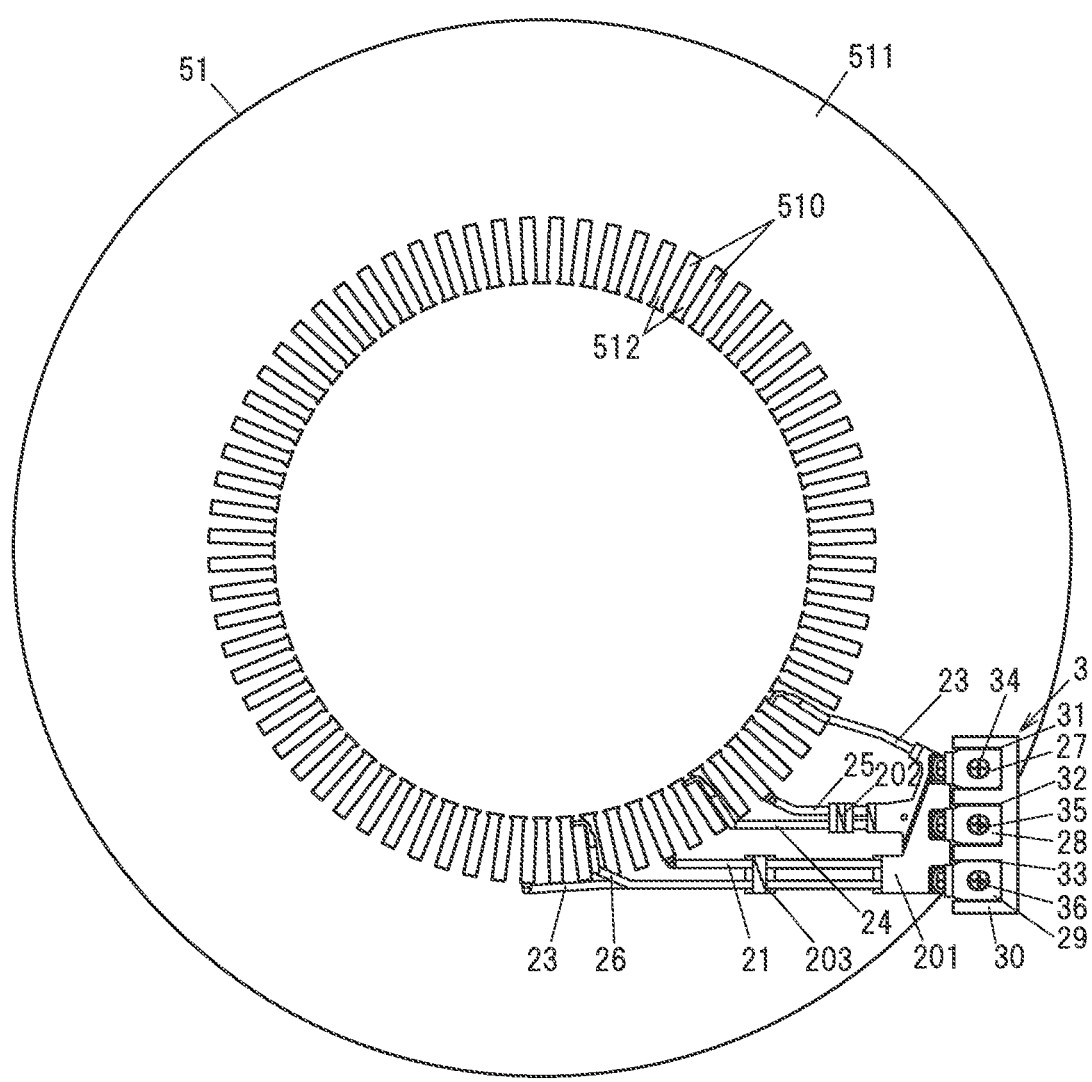
FIG. 2 is a configuration diagram illustrating a wiring member for rotating electrical machine, a terminal block and a stator core when viewed in an axial direction.
Figure 3:
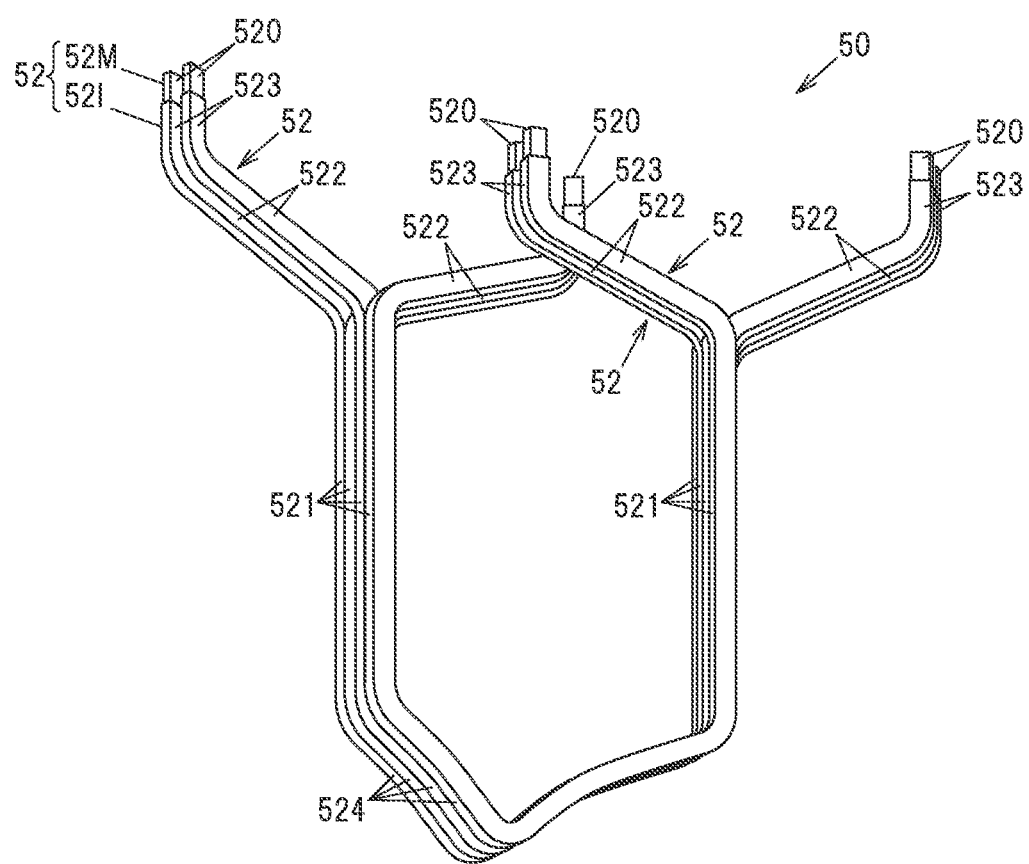
FIG. 3 is a perspective view showing a coil unit constructed from a combination of four coil pieces.

FIG. 2 is a configuration diagram illustrating the wiring member 2 for rotating electrical machine, the terminal block 3 and the stator core 51 when viewed in the axial direction. FIG. 3 is a perspective view showing a coil unit 50 constructed from a combination of four coil pieces 52. Hereinafter, one of two axial sides of the stator core 51, where the wiring member 2 for rotating electrical machine and the terminal block 3 are arranged, is referred to as the upper side and the opposite side is referred to as the lower side, for convenience of explanation. However, the upper and lower sides defined here do not specify top and bottom in the vertical direction in the state of being mounted on the vehicle.

The terminal block 3 has a base 30 formed of a resin and first to third electrodes 31 to 33. The terminal block 3 is fixed to a housing (not shown) which houses the stator 5, and three-phase AC currents are supplied to the first to third electrodes 31 to 33 from a controller.

The stator core 51 integrally has a cylindrical back yoke 511 and plural teeth 512 protruding radially inward from the back yoke 511. In the present embodiment, seventy-two teeth 512 are provided at equal intervals in the circumferential direction, and slots 510 are formed between the circumferentially adjacent teeth 512.

Each coil piece 52 has a pair of straight main portions 521 housed in the slots 510 of the stator core 51, a pair of inclined portions 522 protruding from the slots 510 and located above the stator core 51, a pair of straight portions 523 extended further upward in the axial direction respectively from upper ends of the inclined portions 522, and a connecting portion 524 connecting the pair of main portions 521 below the stator core 51. The inclined portions 522 are inclined so as to form an obtuse angle with respect to the main portions 521.

The coil piece 52 is composed of a conductive metal 52M having high conductivity such as copper or aluminum, and an electrically insulating covering layer 52I covering the surface of the conductive metal 52M. In the present embodiment, the conductive metal 52M is a rectangular solid wire having a rectangular cross-sectional shape, and the covering layer 52I is formed of an enamel coating. At a coil end 520 which is an upper end of the straight portion 523, the covering layer 52I is stripped and the conductive metal 52M is exposed.

In the present embodiment, two hundred and eighty-eight coil pieces 52 are attached to the stator core 51, and eight main portions 521 are housed in each slot 510. The two hundred and eighty-eight coil pieces 52, which are welded to each other at the coil ends 520, form two sets of three-phase (U-, V- and W-phase) stator windings. The two sets of three-phase stator windings are configured that an electrical angle phase of the first set of three-phase stator windings is offset from that of the second first set of three-phase stator windings by a predetermined angle. The first set of three-phase stator windings is formed on the outer peripheral side of the stator core 51 with respect to the second set of three-phase stator windings. Optionally, the welded portions between the coil ends 520 may be coated with a resin.

Figure 4:
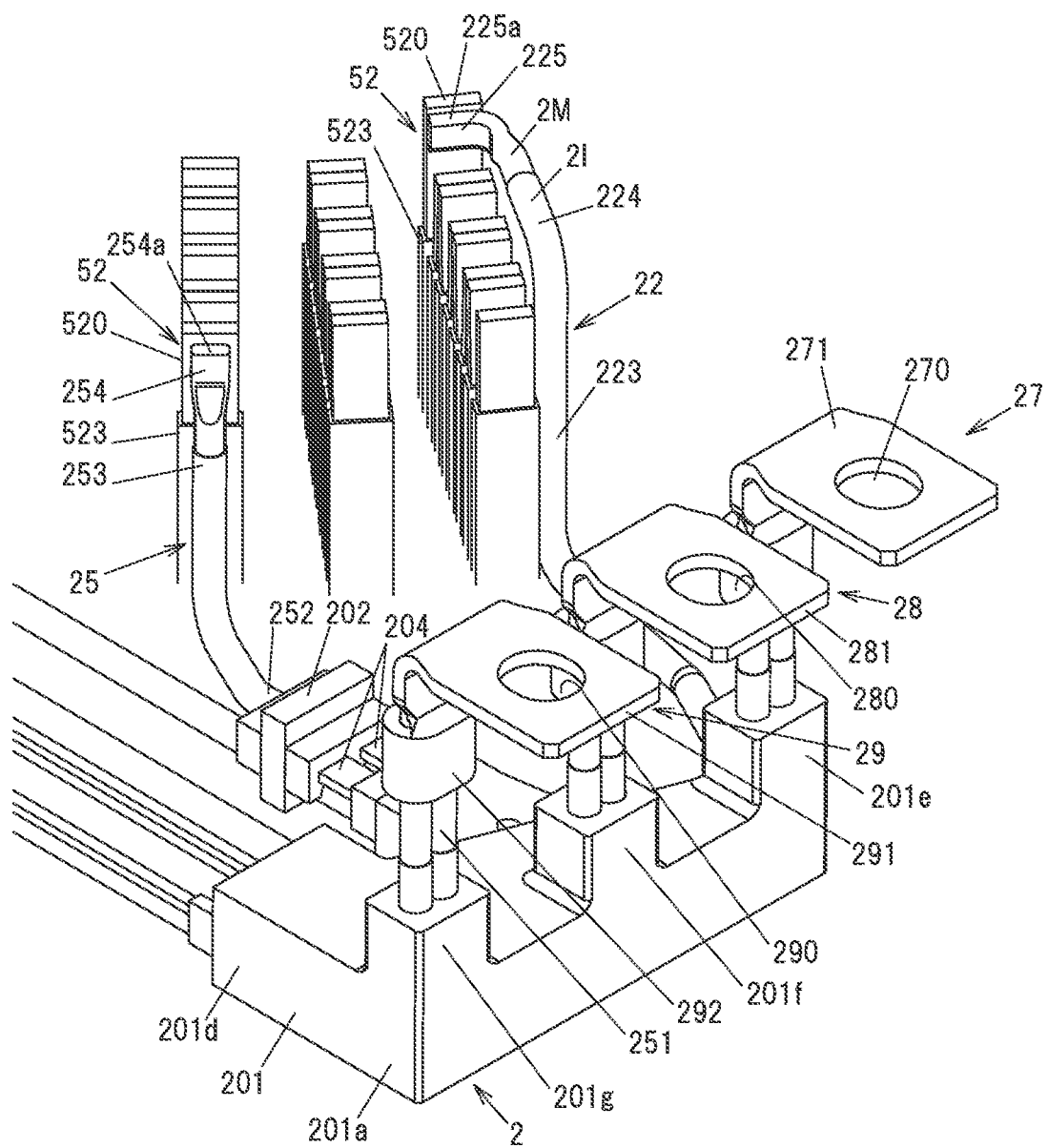
FIG. 4 is a perspective view showing a part of the wiring member for rotating electrical machine, together with straight portions of some of plural coil pieces attached to the stator core.
Figure 5A:
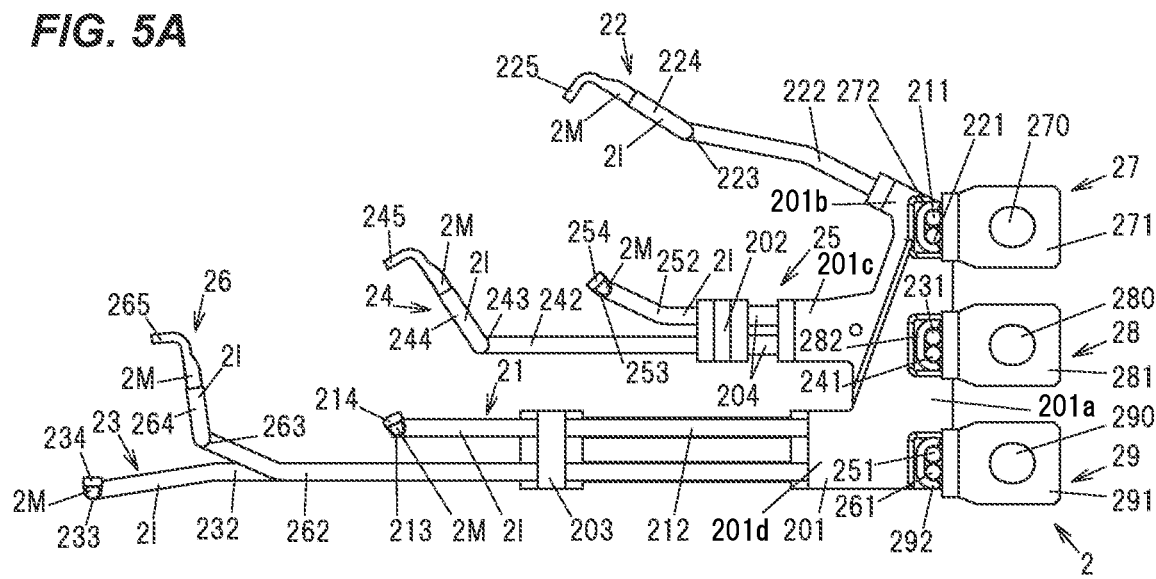
Figure 5B:
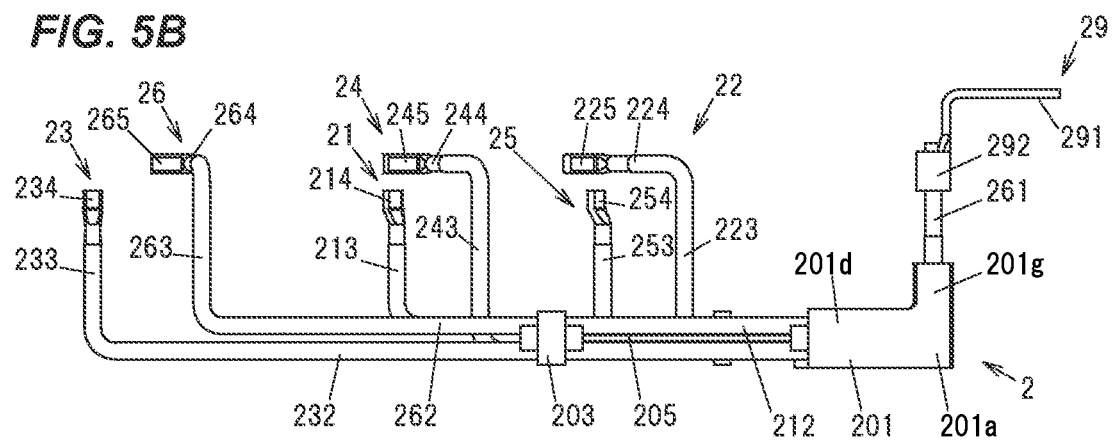
Figure 5C:
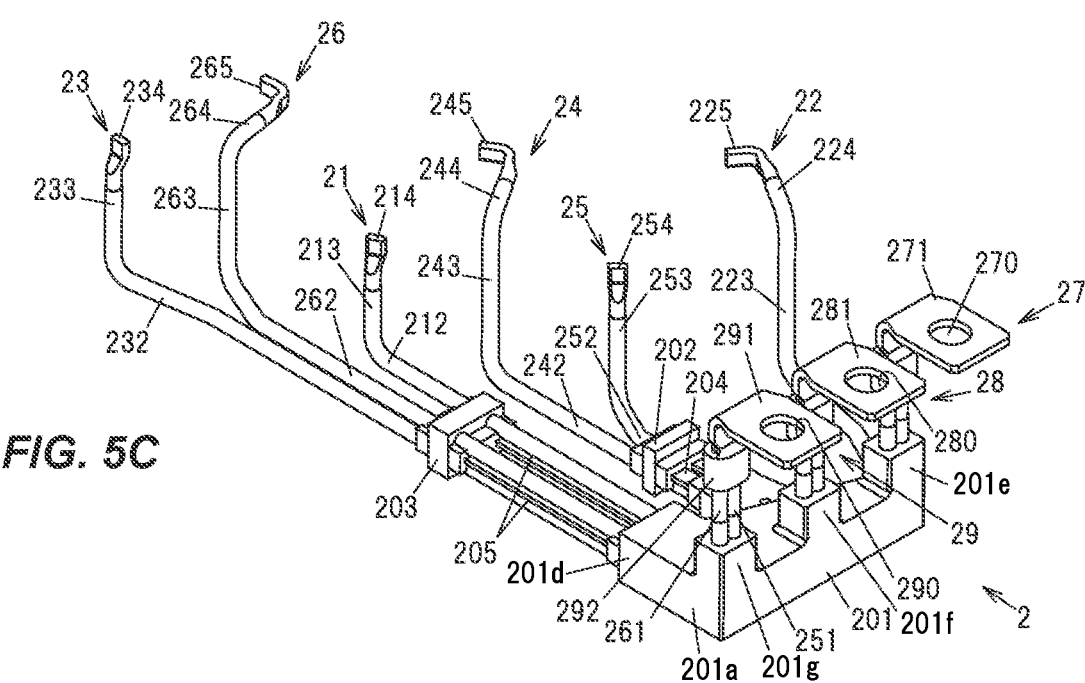

FIG. 4 is a perspective view showing a part of the wiring member 2 for rotating electrical machine, together with the straight portions 523 of some of the plural coil pieces 52 attached to the stator core 51. FIGS. 5A and 5B show the wiring member 2 for rotating electrical machine, wherein FIG. 5A is a diagram as viewed in the axial direction, FIG. 5B is a diagram as viewed in the circumferential direction, and FIG. 5C is a perspective view.

The wiring member 2 for rotating electrical machine has six conductive wires and three terminals, and connects the first to third electrodes 31 to 33 of the terminal block 3 respectively to the coil ends 520 of the coil pieces 52 of the respective phases. Although a so-called bus ring formed by shaping a conductive wire into an annular shape is known as a wiring member for rotating electrical machine, the wiring member 2 for rotating electrical machine in the present embodiment is different from the bus ring and is a non-annular wiring member of which conductive wires are not formed in an annular shape. In addition, the six conductive wires have high rigidity enough to be able to maintain the shape thereof.

The six conductive wires consist of first and second U-phase lead wires 21, 22, first and second V-phase lead wires 23, 24, and first and second W-phase lead wires 25, 26. The three terminals consist of a U-phase terminal 27, a V-phase terminal 28, and a W-phase terminal 29. The U-phase terminal 27 has a plate portion 271 connected to the first electrode 31 of the terminal block 3, and a crimping portion 272 by which both the first and second U-phase lead wires 21, 22 are crimped. A bolt insertion hole 270 is formed on the plate portion 271, and the plate portion 271 is connected to the first electrode 31 by a bolt 34 (see FIG. 2) inserted through the bolt insertion hole 270.

Likewise, the V-phase terminal 28 has a plate portion 281 connected to the second electrode 32 of the terminal block 3, and a crimping portion 282 by which both the first and second V-phase lead wires 23, 24 are crimped. A bolt insertion hole 280 is formed on the plate portion 281, and the plate portion 281 is connected to the second electrode 32 by a bolt 35 (see FIG. 2) inserted through the bolt insertion hole 280. The W-phase terminal 29 also has a plate portion 291 connected to the third electrode 33 of the terminal block 3, and a crimping portion 292 by which both the first and second W-phase lead wires 25, 26 are crimped. A bolt insertion hole 290 is formed on the plate portion 291, and the plate portion 291 is connected to the third electrode 33 by a bolt 36 (see FIG. 2) inserted through the bolt insertion hole 290.

The first U-phase lead wire 21, the first V-phase lead wire 23 and the first W-phase lead wire 25 electrically connect the terminals 27, 28, 29 of the respective phases to the coil ends 520 of the coil pieces 52 which are end portions of the U-, V- and W-phase stator windings of the first set of three-phase stator windings. The second U-phase lead wire 22, the second V-phase lead wire 24 and the second W-phase lead wire 26 electrically connect the terminals 27, 28, 29 of the respective phases to the coil ends 520 of the coil pieces 52 which are end portions of the U-, V- and W-phase stator windings of the second set of three-phase stator windings.

Each of the first and second U-phase lead wires 21, 22, the first and second V-phase lead wires 23, 24 and the first and second W-phase lead wires 25, 26 is configured that the surface of a conductor 2M formed of a conductive metal is covered with an electrically insulating covering layer 21. As the conductive metal, it is possible to suitably use, e.g., copper or copper alloy. As the covering layer 21, it is possible to suitably use an enamel film. The conductor 2M is a solid wire (a single metal conductor which is not a twisted wire) and, in the present embodiment, is formed by pressing a round solid wire having a circular cross-sectional shape into a predetermined shape. Alternatively, the conductor 2M may be formed using a rectangular solid wire having a rectangular cross-sectional shape.

The wiring member 2 for rotating electrical machine is configured that the first and second U-phase lead wires 21, 22, the first and second V-phase lead wires 23, 24 and the first and second W-phase lead wires 25, 26 are held by a first holding portion 201. The first holding portion 201 is one aspect of the holding portion of the invention and is formed by molding a resin so that all the first and second U-phase lead wires 21, 22, the first and second V-phase lead wires 23, 24 and the first and second W-phase lead wires 25, 26 are covered together. The second V-phase lead wire 24 and the first W-phase lead wire 25 are also held by a second holding portion 202. Furthermore, the first U-phase lead wire 21, the first V-phase lead wire 23 and the second W-phase lead wire 26 are also held by a third holding portion 203. The first to third holding portions 201 to 203 are spaced from each other, the first holding portion 201 and the second holding portion 202 are coupled by coupling portions 204, and the first holding portion 201 and the third holding portion 203 are coupled by coupling portions 205. The first to third holding portions 201 to 203 and the coupling portions 204, 205 are formed of a resin and are integrally formed by injection molding. The first to third holding portions 201 to 203 and the coupling portions 204, 205 desirably have rigidity to hold the conductive wires, and can be formed of, e.g., PPS (polyphenylene sulfide).

The first U-phase lead wire 21, the first V-phase lead wire 23 and the first W-phase lead wire 25 have extending-out portions 211, 231, 251 extending out in the axial direction from the first holding portion 201 and respectively connected to the terminals 27, 28, 29 of the respective phases, elongated portions 212, 232, 252 extending out of the first holding portion 201 and running in a direction perpendicular to the axial direction, axially-extended portions 213, 233, 253 extended upward in the axial direction from end portions of the elongated portions 212, 232, 252, and connecting portions 214, 234, 254 welded to the coil ends 520 of the coil pieces 52.

The connecting portions 214, 234, 254 are extended further upward in the axial direction from upper ends of the axially-extended portions 213, 233, 253 and are respectively welded to the coil ends 520 of the coil pieces 52 which are the end portions of the U-, V- and W-phase stator windings of the first set of three-phase stator windings and protrude from the stator core 51 in the axial direction. In addition, the first U-phase lead wire 21, the first V-phase lead wire 23 and the first W-phase lead wire 25 are configured that the covering layers 21 are stripped over a predetermined length range including the connecting portions 214, 234, 254 and the conductors 2M are exposed.

The second U-phase lead wire 22, the second V-phase lead wire 24 and the second W-phase lead wire 26 have extending-out portions 221, 241, 261 extending out in the axial direction from the first holding portion 201 and respectively connected to the terminals 27, 28, 29 of the respective phases, elongated portions 222, 242, 262 extending out of the first holding portion 201 and running in a direction perpendicular to the axial direction, axially-extended portions 223, 243, 263 extended upward in the axial direction from end portions of the elongated portions 222, 242, 262, radially-extended portions 224, 244, 264 further extended in the radial direction from end portions of the axially-extended portions 223, 243, 263 toward the inner side of the stator core 51, and connecting portions 225, 245, 265 which are bent relative to the radial direction so as to extend along the circumferential direction of the stator core 51 and are welded to the coil ends 520 of the coil pieces 52.

The connecting portions 225, 245, 265 are extended in the circumferential direction from radially inner end portions of the radially-extended portions 224, 244, 264 and are respectively welded to the coil ends 520 of the coil pieces 52 which are the end portions of the U-, V- and W-phase stator windings of the second set of three-phase stator windings and protrude from the stator core 51 in the axial direction. In addition, the second U-phase lead wire 22, the second V-phase lead wire 24 and the second W-phase lead wire 26 are configured that the covering layers 21 are stripped over a predetermined length range including the connecting portions 225, 245, 265 and the conductors 2M are exposed. The connecting portions 225, 245, 265 are bent in the circumferential direction of the stator core 51 at the radially inner end portions of the radially-extended portions 224, 244, 264 and extend along the circumferential direction.

The connecting portions 225, 245, 265 of the second U-phase lead wire 22, the second V-phase lead wire 24 and the second W-phase lead wire 26 are connected to the coil ends 520 on the radially inner side of the stator core 51 with respect to the connecting portions 214, 234, 254 of the first U-phase lead wire 21, the first V-phase lead wire 23 and the first W-phase lead wire 25. Each of the connecting portions 214, 225, 234, 245, 254, 265 is formed by pressing so that a surface facing the coil end 520 is flat.

In the present embodiment, the connecting portions 214, 225, 234, 245, 254, 265 are welded to the coil ends 520 of the coil pieces 52 by TIG (Tungsten Inert Gas) welding which is a type of arc welding process using an inert gas. At the time of the TIG welding, the stator 5 is fixed to a jig so that the coil ends 520 protrude upward in the normal direction from the stator core 51, and an electrode of a welding torch is positioned to face the coil ends 520 in the axial direction.

As shown in FIG. 4 in which the second U-phase lead wire 22 and the first W-phase lead wire 25 are taken as an example, the coil ends 520 protrude longer than the connecting portions 225, 254 in the axial direction during the TIG welding, and portions of the coil ends 520 protruding beyond the connecting portions 225, 254 in the axial direction are melted by heat of arc discharge and the coil ends 520 are welded to the connecting portions 225, 254. Molten metal produced by melting tip portions of the coil ends 520 flows down and comes into contact with an up-facing side surface 225a of the connecting portion 225 of the second U-phase lead wire 22 and an upper surface 254a of the connecting portion 254 of the first W-phase lead wire 25. However, the configuration is not limited thereto and the tip end faces of the coil ends 520 may be located at the same axial position as the up-facing side surface 225a of the connecting portion 225 and the upper surface 254a of the connecting portion 254. In other words, the coil ends 520 do not need to protrude beyond the connecting portions 225, 254 in the axial direction.

The first holding portion 201 has a main body 201a holding the six conductive wires, and plural protruding portions 201b to 201d which protrude from the main body 201a and cover the conductive wires (the elongated portions 212, 222, 232, 242, 252, 262) extending out of the main body 201*a* toward the coil end 520. In the present embodiment, the first protruding portion 201*b* is provided so that a portion of the elongated portion 222 extending out of the main body 201*a* is covered. Then, the second protruding portion 201*c* is provided so that portions of the elongated portions 242, 252 extending out of the main body 201*a* are covered together. Furthermore, the third protruding portion 201*d* is provided so that portions of the elongated portions 212, 232, 262 extending out of the main body 201*a* are covered together. Each of the protruding portions 201*b* to 201*d* is provided integrally with the main body 201*a* so as to protrude from the main body 201*a* in a direction perpendicular to the axial direction.

The first holding portion 201 also has plural terminal-side protruding portions 201*e* to 201*g* which protrude from the main body 201*a* so as to cover the conductive wires (the extending-out portions 211, 221, 231, 241, 251, 261) extending from the main body 201*a* toward the terminals 27, 28, 29 of the respective phases. In the present embodiment, the first terminal-side protruding portion 201*e* is provided so that portions of the extending-out portions 211, 221 extending out of the main body 201*a* are covered together. Then, the second terminal-side protruding portion 201*f* is provided so that portions of the extending-out portions 231, 241 extending out of the main body 201*a* are covered together. Furthermore, the third terminal-side protruding portion 201*g* is provided so that portions of the extending-out portions 251, 261 extending out of the main body 201*a* are covered together. Each of the terminal-side protruding portions 201*e* to 201*g* is provided integrally with the main body 201*a* so as to protrude from the main body 201*a* in the axial direction.

Arrangement Structure of Wiring Member for Rotating Electrical Machine

Figure 6A:
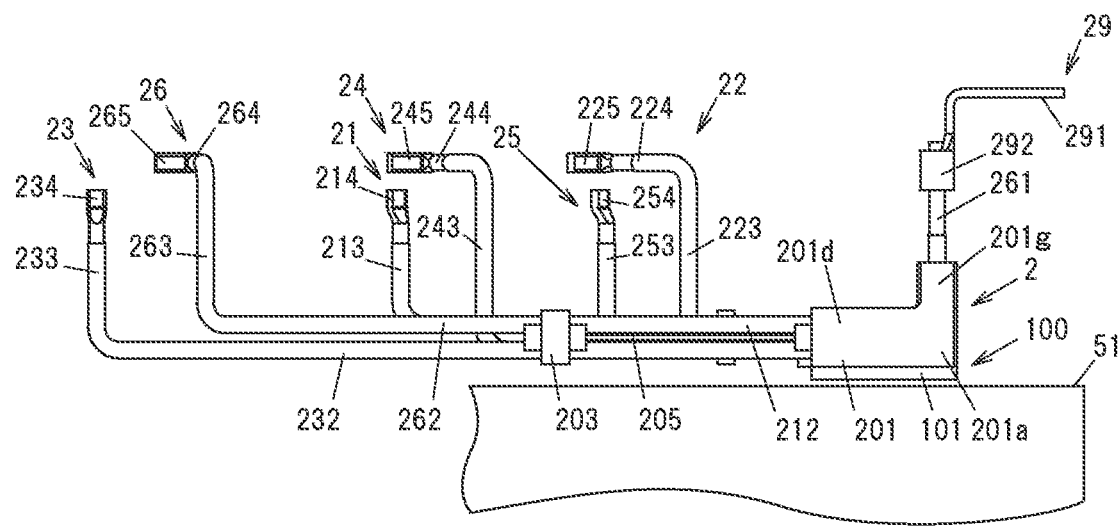
FIG. 6A is a diagram illustrating the arrangement structure of wiring member for rotating electrical machine in the embodiment of the invention.
Figure 6B:
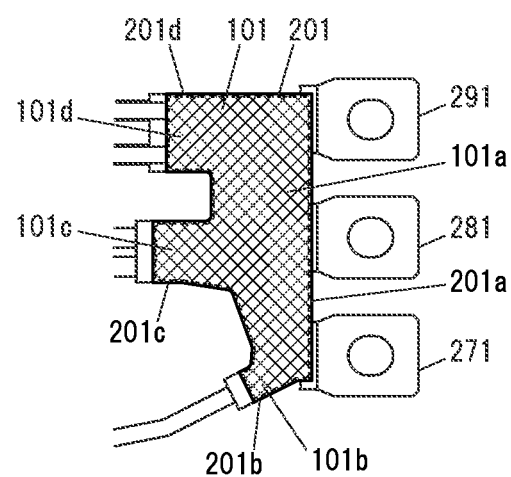
FIG. 6B is a plan view showing a first holding portion as viewed from the lower surface side.

As shown in FIGS. 1B, 6A and 6B, an arrangement structure 100 of wiring member for rotating electrical machine is a structure in which the wiring member 2 for rotating electrical machine is arranged on the stator core 51 as the arranging target member. Although an example in which the arranging target member is the stator core 51 is described here, it is not limited thereto. The arranging target member may be a housing which houses the stator core 51. Further alternatively, the arranging target member may be an insulating plate or a metal plate arranged on the stator core 51.

The arrangement structure 100 of wiring member for rotating electrical machine in the present embodiment is configured such that a cushioning member 101 formed of an elastic body is provided between the first holding portion 201 and the stator core 51 and the first holding portion is fixed to the stator core 51 via the cushioning member 101.

The cushioning member 101 is formed of a sheet-shaped member with elasticity and serves to prevent damage on the first holding portion 201 due to repeated collision with the stator core 51 caused by vibration. It is desirable to use the cushioning member 101 having flexibility to absorb wobbling movement of the first holding portion 201 caused by vibration, and it is preferable to use the cushioning member 101 formed of a softer material than the stator core 51 as the arranging target member and the first holding portion 201.

In addition, it is desirable to use the cushioning member 101 formed of a material which also withstands high temperature (e.g., 150° C. to 200° C.) since the surrounding temperature is elevated during use. Furthermore, when the rotating electrical machine 1 is an oil-cooled motor, it is desirable to use the cushioning member 101 excellent in oil resistance since the cushioning member 101 comes into contact with cooling oil during use. The materials satisfying such characteristics include fluorocarbon rubber, silicone rubber, acrylic rubber and hydrogenated nitrile rubber, etc.

The thickness of the cushioning member 101 is set by taking into account elastic modulus, etc., of the material used to form the cushioning member 101, so that the impact of vibration on the first holding portion 201 can be reduced sufficiently. In detail, when using the cushioning member 101 formed of a rubber such as fluorocarbon rubber, the thickness thereof is desirably not less than 0.5 mm and not more than 5 mm, more desirably, not less than 1 mm and not more than 2 mm.

In the present embodiment, the cushioning member 101 has a main body-protector portion 101*a* covering the bottom surface of the main body 201*a* and first to third protruding portion-protector portions 101*b* to 101*d* covering the bottom surfaces of the first to third protruding portions 201*b* to 201*d*, and is provided to cover substantially the entire bottom surface of the first holding portion 201. In this regard, the cushioning member 101 does not need to be one piece and may be configured such that, e.g., the main body-protector portion 101*a* and the first to third protruding portion-protector portions 101*b* to 101*d* are provided separately.

The cushioning member 101 is fixed to at least one of the first holding portion 201 and the stator core 51. In the present embodiment, one surface (the upper surface) of the cushioning member 101 is preliminarily adhered and fixed to the bottom surface of the first holding portion 201, and the other surface (the lower surface) of the cushioning member 101 is adhered and fixed to the upper surface of the stator core 51 at the time of attaching the wiring member 2 for rotating electrical machine. However, it is not limited thereto. The configuration may be such that the cushioning member 101 is preliminarily adhered and fixed to the upper surface of the stator core 51, and the first holding portion 201 and the cushioning member 101 are adhered and fixed to each other at the time of attaching the wiring member 2 for rotating electrical machine.

In addition, the cushioning member 101 is preferably squashed by pressing the first holding portion 201 toward the stator core 51 at the time of attaching the wiring member 2 for rotating electrical machine and stays in a deformed state. This prevents wobbling movement of the first holding portion 201 caused by vibration, thereby further preventing damage on the first holding portion 201 due to vibration. Since the cushioning member 101 is held by pressing the first holding portion 201 against the stator core 51, the cushioning member 101 may be adhered and fixed to only one of the first holding portion 201 and the stator core 51. In case that the cushioning member 101 is not fixed to any of the first holding portion 201 and the stator core 51, the cushioning member 101 may be displaced due to vibration, etc., and come off. Therefore, the cushioning member 101 is desirably adhered and fixed to at least one of the first holding portion 201 and the stator core 51.

Modifications

Figure 7A:
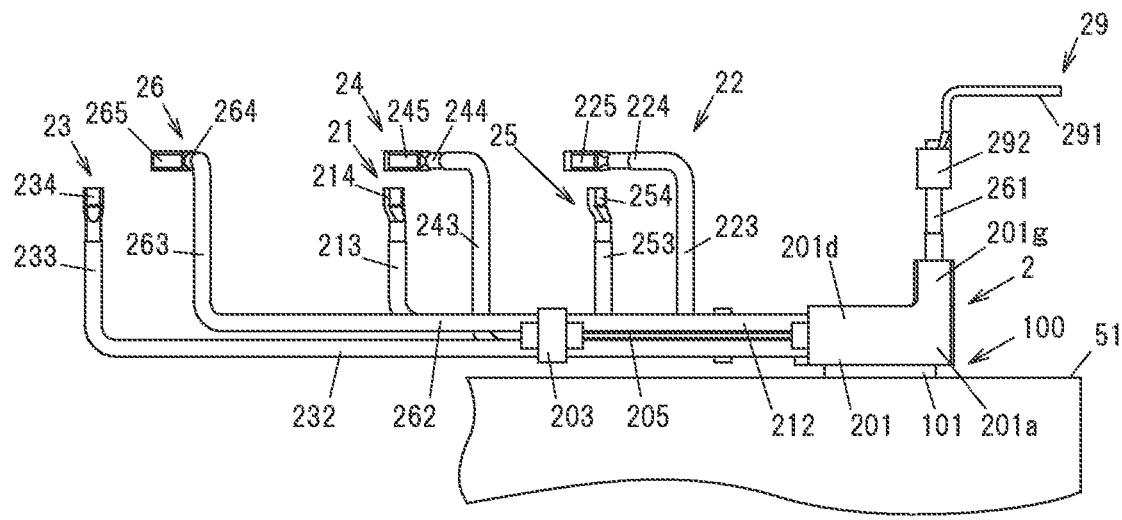
FIGS. 7A and 7B are diagrams illustrating the arrangement structure of wiring member for rotating electrical machine in modifications of the invention.
Figure 7B:
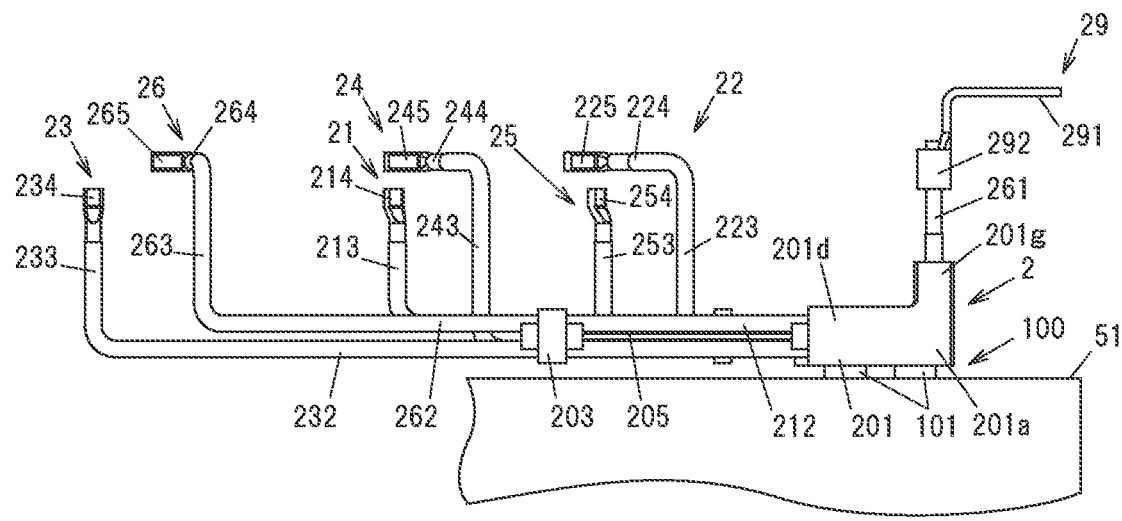

Although the cushioning member 101 in the present embodiment is formed in substantially the same shape as the bottom surface of the first holding portion 201 and is provided to cover substantially the entire bottom surface of the first holding portion 201, the cushioning member 101 may be provided to only partially cover the bottom surface of the first holding portion 201 as shown in FIGS. 7A and 7B. The cushioning member 101 may be provided at a center portion of the bottom surface of the first holding portion 201 as shown in FIG. 7A, or plural cushioning members 101 may be provided at a distance as shown in FIG. 7B. In this case, it is possible to reduce the amount of the cushioning member 101 to be used and thereby reduce the cost. The configurations shown in FIGS. 7A and 7B are suitable particularly when the cushioning member 101 is preliminarily fixed to the first holding portion 201.

Figure 8A:
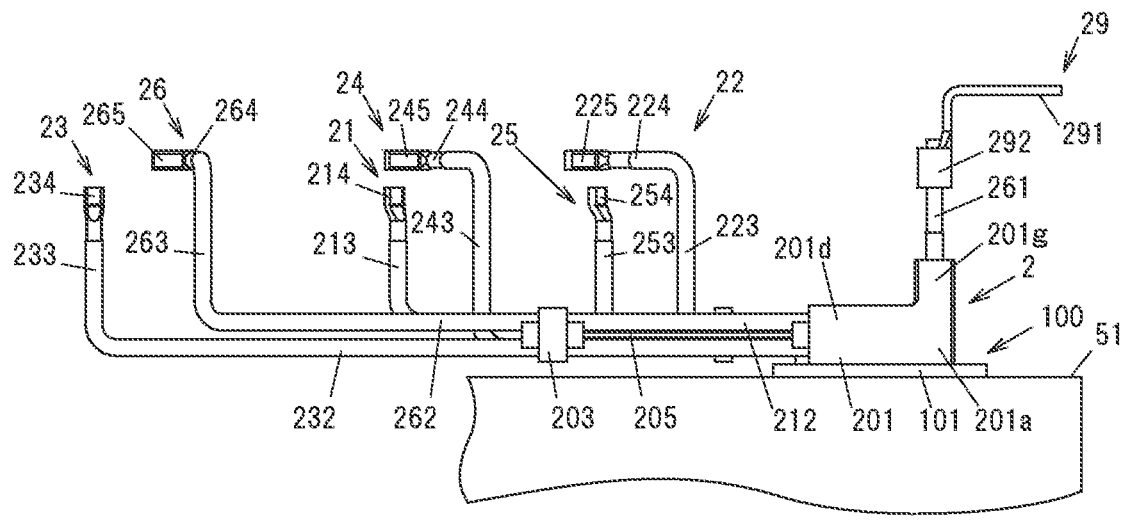
FIGS. 8A and 8B are diagrams illustrating the arrangement structure of wiring member for rotating electrical machine in modifications of the invention.

Alternatively, the cushioning member 101 may be provided so as to protrude laterally from the bottom surface of the first holding portion 201, as shown in FIG. 8A. In this case, the cushioning member 101 is desirably firmly fixed to the stator core 51 so that the edge portion of the cushioning member 101 not pressed by the first holding portion 201 is not separated due to vibration. In this case, the edge portion of the cushioning member 101 can be firmly fixed to the stator core 51 by screwing, etc. The configuration shown in FIG. 8A is suitable particularly when the cushioning member 101 is preliminarily fixed to the stator core 51.

Figure 8B:
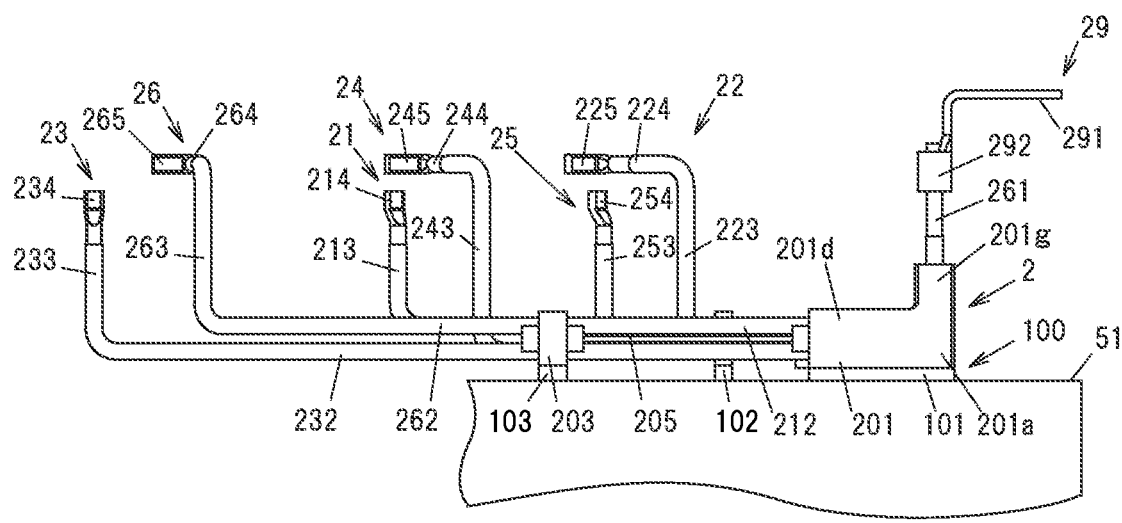

Furthermore, cushioning members 102 and 103 may be additionally provided between the second and third holding portions 202, 203 and the stator core 51, as shown in FIG. 8B. This prevents damage on the second and third holding portions 202, 203 due to vibration. The cushioning members 102 and 103 only need to be fixed at least either the second and third holding portions 202, 203 or the stator core 51.

Figure 9:
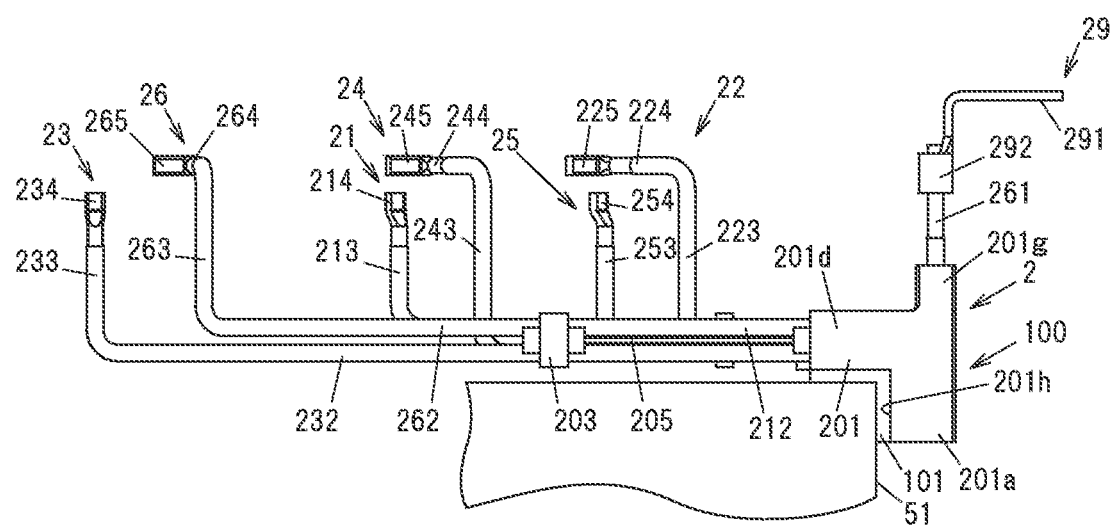
FIG. 9 is diagram illustrating the arrangement structure of wiring member for rotating electrical machine in a modification of the invention.

The example in which the cushioning member 101 is provided on the upper surface of the stator core 51 has been described in the present embodiment, but there could be a case where the first holding portion 201 has a step portion on the bottom surface and is provided to cover a corner of the stator core 51 in a state that a step surface 201h facing a side surface of the stator core 51 is in contact with the side surface of the stator core 51 as shown in FIG. 9. In such a case, it is desirable to provide the cushioning member 101 also between the step surface 201h and the side surface of the stator core 51 to prevent collision between the first holding portion 201 and the side surface of the stator core 51 due to vibration, and the cushioning member 101 is desirably provided on both the upper and side surfaces of the stator core 51. Although one sheet of cushioning member 101 is provided over the upper and side surfaces of the stator core 51 in this example, the cushioning member 101 on the upper surface of the stator core 51 may be provided separately from the cushioning member 101 on the side surface of the stator core 51.

Furthermore, although the example in which the sheet-shaped cushioning member 101 is adhered and fixed to the first holding portion 201 or the stator core 51 has been described in the present embodiment, it is not limited thereto. The cushioning member 101 may be integrally molded with the first holding portion 201 by co-molding. In case of the co-molding, a resin constituting the first holding portion 201 and a resin constituting the cushioning member 101 are poured into a mold, and the first holding portion 201 and the cushioning member 101 are integrally molded.

In addition, a molded resin may be further provided so that the stator core 51 as the arranging target member, the coil pieces 52 and the wiring member 2 for rotating electrical machine are partially covered, even though it is not mentioned in the embodiment. In the present embodiment, since the first holding portion 201 is fixed to the stator core 51 as the arranging target member via the cushioning member 101, displacement of the wiring member 2 for rotating electrical machine due to resin pressure during molding the molded resin can be suppressed.

Functions and Effects of the Embodiment

As described above, the arrangement structure 100 of wiring member for rotating electrical machine in the present embodiment is configured that the cushioning member 101 formed of an elastic body is provided between the first holding portion 201 and the stator core 51 as the arranging target member and the first holding portion 201 is arranged on the stator core 51 via the cushioning member 101. As a result, even when a gap is formed between the first holding portion 201 and the stator core 51 as the arranging target member due to a manufacturing error, etc., damage on the first holding portion 201 due to collision with the stator core 51 can be suppressed by filling such a gap with the cushioning member 101.

Summary of the Embodiment

Technical ideas understood from the above described embodiment will be described below citing the reference numerals, etc., used for the embodiment. However, each reference numeral, etc., described below is not intended to limit the constituent elements in the claims to the members, etc., specifically described in the embodiment.

[1] An arrangement structure (100) of wiring member for rotating electrical machine being configured in such a manner that a wiring member (2) for rotating electrical machine comprising a plurality of conductive wires (21 to 26) and connecting coil ends (520) of a stator (5) to electrodes (31 to 33) of a terminal block (3) in a rotating electrical machine (1) is arranged on an arranging target member, wherein the wiring member (2) for rotating electrical machine comprises a holding portion (201) including a molded resin so as to cover all the plurality of conductive wires (21 to 26) together and holds the plurality of conductive wires (21 to 26), a cushioning member (101) comprising an elastic body is provided between the holding portion (201) and the arranging target member, and the holding portion (201) is arranged on the arranging target member via the cushioning member (101).

[2] The arrangement structure (100) of wiring member for rotating electrical machine described in the [1], wherein the cushioning member (101) comprises a softer material than the holding portion (201).

[3] The arrangement structure (100) of wiring member for rotating electrical machine described in the [1] or [2], wherein the cushioning member (101) is fixed to at least one of the holding portion (201) and the arranging target member.

[4] The arrangement structure (100) of wiring member for rotating electrical machine described in the [3], wherein the cushioning member (101) comprises a sheet-shaped member that is adhered and fixed to at least one of the holding portion (101) and the arranging target member.

[5] The arrangement structure (100) of wiring member for rotating electrical machine described in the [3], wherein the cushioning member (101) is molded integrally with the holding portion (201).

[6] The arrangement structure (100) of wiring member for rotating electrical machine described in any one of the [1] to [5], wherein the arranging target member comprises a stator core (51) or a housing of the rotating electrical machine (1).

Although the embodiment of the invention has been described, the invention according to claims is not to be limited to the embodiment. Further, please note that all combinations of the features described in the embodiment are not necessary to solve the problem of the invention. In addition, the invention can be appropriately modified and implemented without departing from the gist thereof.

What is claimed is:

1. An arrangement structure of a wiring member for a rotating electrical machine being configured in such a manner that the wiring member for the rotating electrical machine comprising a plurality of conductive wires and connecting coil ends of a stator to electrodes of a terminal block in the rotating electrical machine is arranged on an arranging target member,
   wherein the wiring member for the rotating electrical machine comprises;
   a holding portion including a molded resin so as to cover all the plurality of conductive wires together and holds the plurality of conductive wires,
   a cushioning member comprising an elastic body is provided between the holding portion and the arranging target member,
   wherein the holding portion is arranged on the arranging target member via the cushioning member,
   wherein the holding portion further comprises a main body holding the plurality of conductive wires, and plural protruding portions protruding from the main body to cover portions of the plurality of conductive wires extending out of the main body toward the coil ends, and
   wherein the cushioning member comprises a main body-protector portion covering a bottom surface of the main body, and protruding portion-protector portions covering bottom surfaces of the plural protruding portions.

2. The arrangement structure of wiring member for the rotating electrical machine according to claim 1, wherein the cushioning member comprises a softer material than the holding portion.

3. The arrangement structure of wiring member for the rotating electrical machine according to claim 1, wherein the cushioning member is fixed to at least one of the holding portion and the arranging target member.

4. The arrangement structure of wiring member for the rotating electrical machine according to claim 3, wherein the cushioning member comprises a sheet-shaped member that is adhered and fixed to at least one of the holding portion and the arranging target member.

5. The arrangement structure of wiring member for the rotating electrical machine according to claim 3, wherein the cushioning member is molded integrally with the holding portion.

6. The arrangement structure of wiring member for the rotating electrical machine according to claim 1, wherein the arranging target member comprises a stator core or a housing of the rotating electrical machine.

7. The arrangement structure of wiring member for the rotating electrical machine according to claim 1,
   wherein the plurality of conductive wires comprise connecting portions to be in contact with and connected to the coil ends respectively, and
   wherein each of the connecting portions has a flat surface facing the corresponding coil end.

* * * * *